(12) United States Patent
Oda et al.

(10) Patent No.: US 6,339,325 B1
(45) Date of Patent: Jan. 15, 2002

(54) APPARATUS FOR DETECTING GEAR POSITIONS OF AUTOMOBILE TRANSMISSION

(75) Inventors: Katsushi Oda, Tokyo-To; Masayuki Nishimura, Osaka, both of (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,780

(22) Filed: Dec. 17, 1999

(30) Foreign Application Priority Data

Dec. 18, 1998 (JP) .......................................... 10-361320

(51) Int. Cl.$^7$ ................................................. G01B 7/14
(52) U.S. Cl. ................................. 324/207.2; 324/207.22
(58) Field of Search ........................ 324/207.2, 207.13, 324/207.22, 207.24, 207.25, 207.26; 338/321; 341/15; 74/335, 473.12

(56) References Cited

U.S. PATENT DOCUMENTS

| | | | | |
|---|---|---|---|---|
| 5,307,013 A | * | 4/1994 | Santos et al. ............. | 324/207.2 |
| 5,370,015 A | * | 12/1994 | Moscatelli .................... | 74/335 |
| 5,747,987 A | * | 5/1998 | Smith ..................... | 324/207.13 |
| 6,155,128 A | * | 12/2000 | Ersoy et al. ............. | 74/473.12 |

FOREIGN PATENT DOCUMENTS

| | | |
|---|---|---|
| JP | 5296318 | 11/1993 |
| JP | 6293225 | 10/1994 |
| JP | 8303563 | 11/1996 |
| JP | 8312766 | 11/1996 |

* cited by examiner

*Primary Examiner*—Safet Metjahic
*Assistant Examiner*—Subhash Zaveri
(74) *Attorney, Agent, or Firm*—Smith, Gambrell & Russell, LLP

(57) ABSTRACT

A gear position detecting apparatus includes three magnets fixed to a transmission housing for generating magnetism and three hole elements fixed to the transmission housing for detecting magnetism generated from the magnets. A magnetism shielding plate is provided between the magnets and the hall elements. The magnetism shielding plate is slidably and rotatably movable according to a shift pattern of a shift lever and has a plurality of holes and a cut-out portion. The magnetism generated from the magnets is permitted or forbidden to pass through these holes or the cut-out portion according to the movement of the magnetism shielding plate which is moved by the shift lever. The hall elements output an ON-signal when the magnetism is permitted to pass through and an OFF-signal when the magnetism is forbidden to pass through. As a result, a plurality of combinations of binary signals are produced corresponding to gear positions.

14 Claims, 5 Drawing Sheets

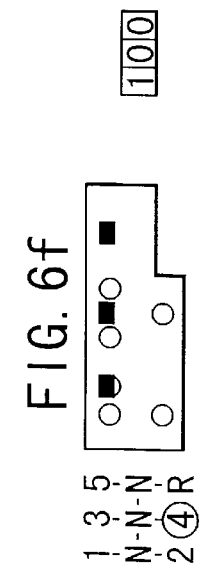
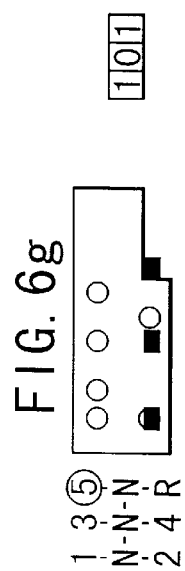
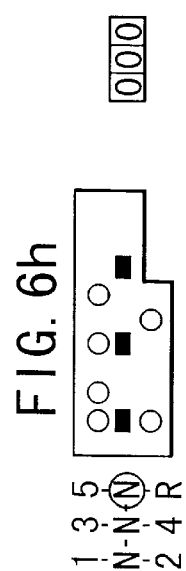
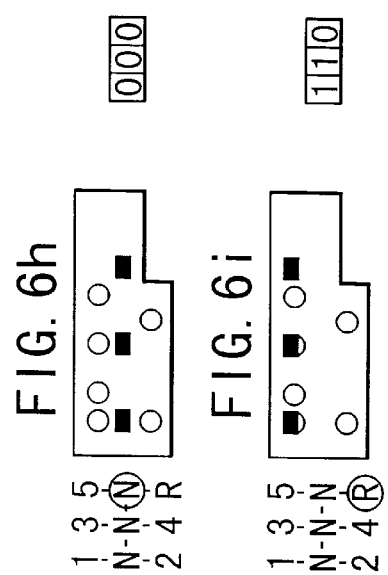
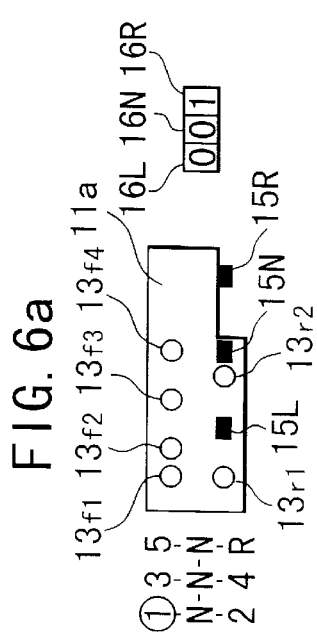
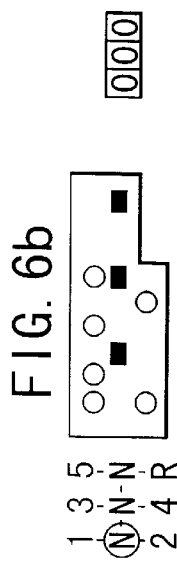
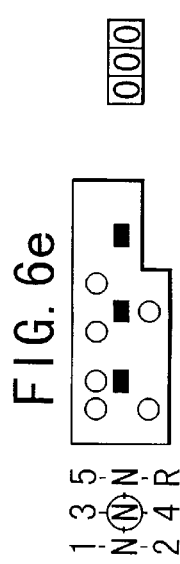

APPARATUS FOR DETECTING GEAR POSITIONS OF AUTOMOBILE TRANSMISSION

BACKGROUND OF THE INVENTION

1. Field of the Invention

The present invention relates to an apparatus for detecting gear positions of a manual transmission for a vehicle.

2. Background Art

In recent years, an increasing number of vehicles are equipped with control systems in which a gear position is one of control parameters for controlling fuel injection amounts, fuel injection timing, driving force distribution and the like.

In case of automatic transmission vehicles, a selector position selected by a driver can be detected by an inhibitor switch which is operated by a selector lever, however in case of manual transmission vehicles, a special, independent apparatus is additionally needed for detecting gear positions.

Japanese Patent Application Laid-open No. Toku-Kai-Hei 6-293225 discloses an apparatus for detecting gear positions. In a transmission wherein gears are selected by the combination of a longitudinal motion and a rotational motion of a shift lever, the apparatus comprises three magnets arranged circumferentially on a first rotor, three magnets arranged in the longitudinal (axial) direction, and hall elements corresponding to these magnets arranged circumferentially and longitudinally respectively on a second rotor.

However, this prior art needs six sets of magnets and hall elements in order to detect the respective gear positions of five forward speeds and one reverse speed. Further, wiring arrangements are needed between these hall elements. Therefore, the number of components and the size of the apparatus increase, this resulting in an increase of the man hours for assembling and manufacturing costs.

SUMMARY OF THE INVENTION

It is an object of the present invention to provide a gear position detecting apparatus composed of small number of magnets and hall elements, having a small size and of a low cost.

The apparatus comprises a magnetism generating means fixed to a transmission housing for generating a magnetism, a magnetism shielding plate fixed to a rod for selecting a gear of the transmission and provided outside of the magnetism generating means with respect to the rod, for shielding the magnetism, a magnetism passing means provided in the magnetism shielding plate for permitting or forbidding the magnetism to pass therethrough according to a sliding and rotating movement of the rod, a magnetism detecting means fixed to the transmission housing and provided outside of the magnetism shielding plate for detecting the magnetism and for outputting an ON signal when the magnetism is permitted to pass through the magnetism passing means and an OFF signal when the magnetism is forbidden to pass through the magnetism passing means and a gear position judging means for judging the selected gear position based on the combination of the ON and OFF signals.

BRIEF DESCRIPTION OF THE DRAWINGS

FIG. 6 is an explanatory view showing a state of detecting magnetism in respective gear positions.

DESCRIPTION OF THE PREFERRED EMBODIMENT

Figure 1:
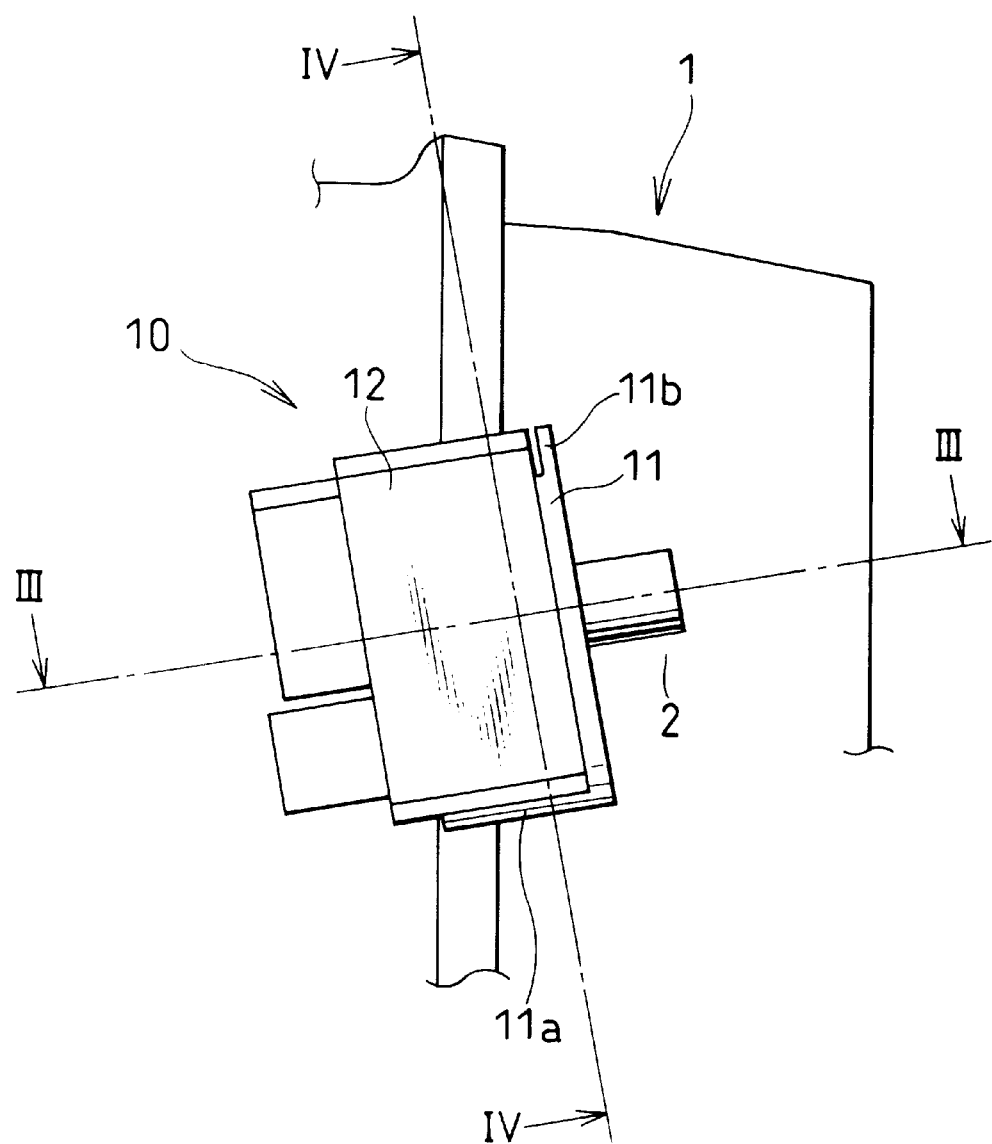
FIG. 1 is an enlarged, explanatory view of a gear position detecting apparatus according to the present invention.
Figure 2:
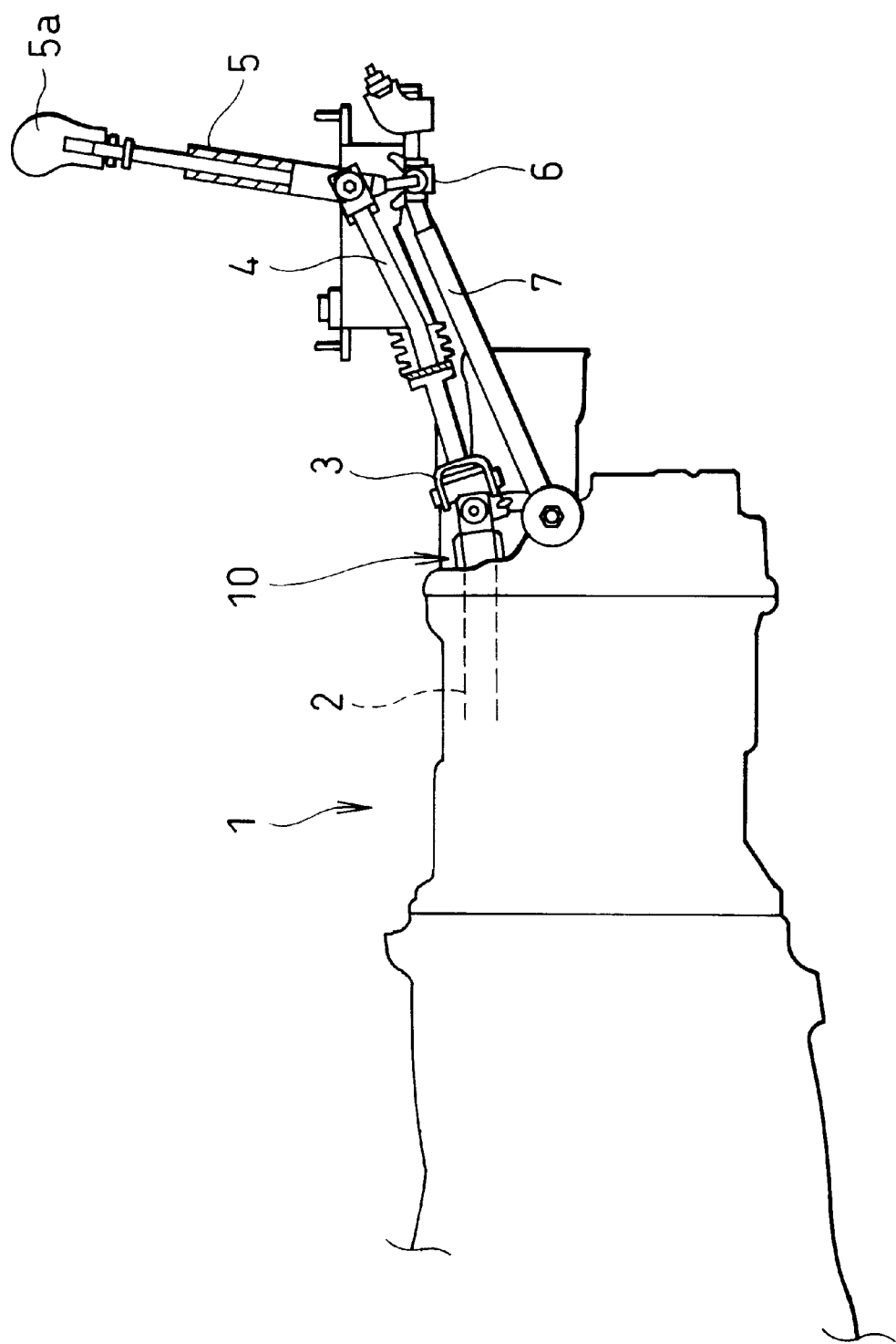
FIG. 2 is an explanatory view showing a state of installing a gear position detecting apparatus on a transmission.

Referring now to FIG. 2, reference numeral 1 denotes a transmission housing of a longitudinally mounted manual transmission (not shown) having five forward speeds (1st, 2nd, 3rd, 4th, and 5th) and one reverse speed. Gear changes are performed by displacing a gear corresponding to each gear ratio by a shifter fork (not shown) provided on a plurality of shifter rails (not shown) in the transmission housing 1. Further, a rear end portion of a rod 2 having a selector arm (not shown) for actuating respective shifter rails is projected rearward outside of the transmission housing 1 and the rod 2 is at the rear end thereof with a shift rod 4 through a universal joint 3.

The shift rod 4 is jointably connected at a rear end thereof with an intermediate portion of a shift lever 5 having a shift knob 5a at an upper end thereof. A lower end portion of the shift lever 5 is jointably connected with an intermediate portion of a stay 7 provided across a rear end of the transmission 1 and a vehicle floor panel through a ball joint 6.

The shift lever 5 is actuated around the ball joint 6 by a vehicle driver so as to move the rod 2 in the axial direction or in the rotational direction through the shift rod 4 and the universal joint 3. When the driver tilts the shift lever 5 forward, the rod 2 is displaced in the axial and forward direction so as to be ready to select either of gear speeds 1st, 3rd and 5th. When the driver tilts the shift lever 5 backward, the rod 2 is displaced backward in the axial direction so as to be ready to select either of gear speeds 2nd, 4th and reverse. When the sift lever 5 is positioned at a neutral position where it is not tilted forwardly nor rearwardly, the gear speed is at neutral (N) condition. When the driver tilts the shift lever 5 to the left, the rod 2 rotates to the left so as to ready to select either of 1st, N and 2nd. On the contrary, when the driver tilts the shift lever 5 to the right, the rod 2 rotates to the right so as to ready to select either of 5th, N and R. When the shift lever 5 is positioned in a neutral position where it is not tilted to the left nor to the right, the gear position is at either of 3rd, N and 4th. Thus, when the driver tilts the shift lever 5 in the forward and left direction, 1st speed is obtained, when the driver tilts the shift lever 5 in the rearward and left direction, 2nd speed is obtained, when the driver tilts the shift lever 5 in the forward and right direction, 3rd speed is obtained, when the driver tilts the shift lever 5 in the rearward and right direction, 4th speed is obtained, when the driver tilts the shift lever 5 in the forward and right direction, 5th speed is obtained, when the driver tilts the shift lever 5 in the rearward and right direction, reverse speed is obtained, and when the driver holds the shift lever 5 in the neutral position, the gear position is retained at N.

Further, reference numeral 10 denotes a gear position detecting apparatus which is disposed outside of the transmission housing 1, at the rear end of the rod 2 and immediately before the universal joint 3.

The gear position detecting apparatus 10 comprises a magnetism shielding plate 11 and a magnetism detecting section 12, in which the magnetism shielding plate 11 is fixed to the rod 2 and the magnetism detecting section 12 is fixed to the transmission housing 1.

Figure 5:
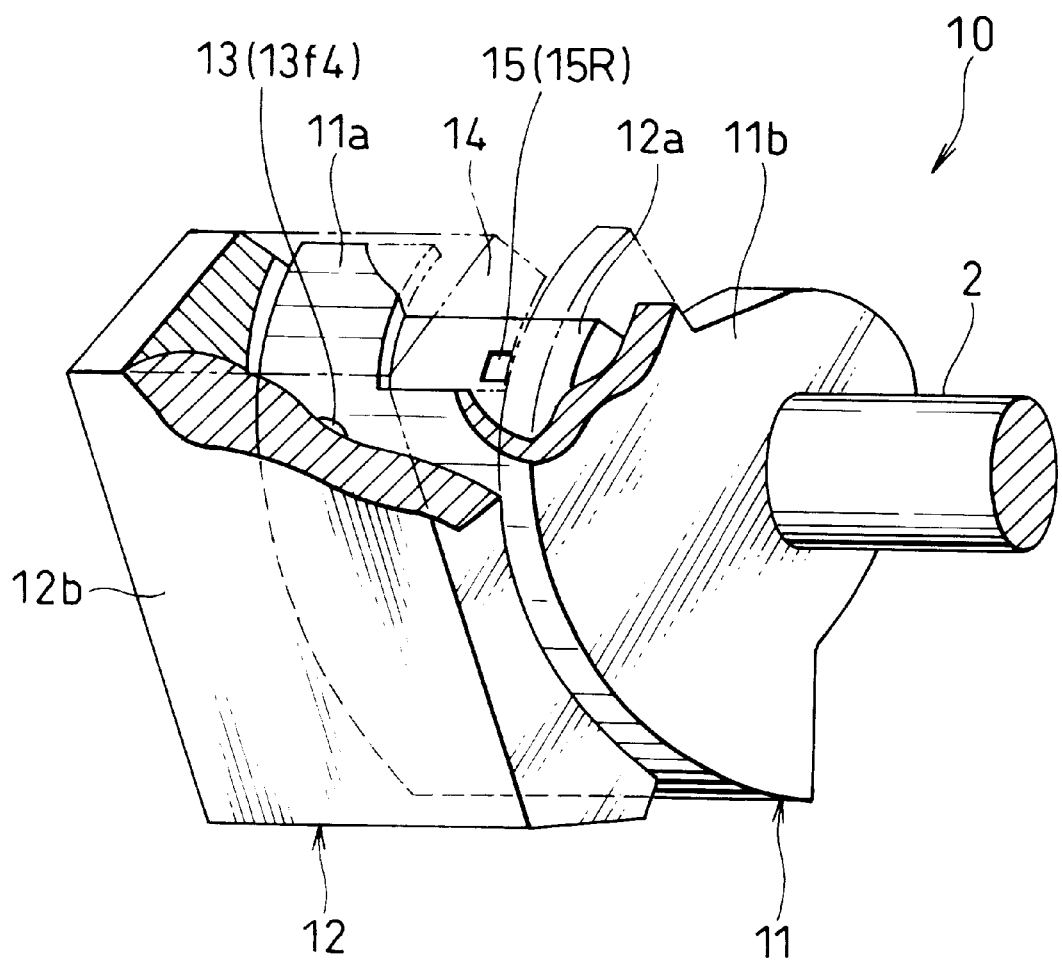
FIG. 5 is a perspective view of a gear position detecting apparatus.

The magnetism shielding plate 11, as shown in FIG. 5, comprises a side plate 11a slidable and rotatable around an axis of the rod 2 and a supporting bottom plate 11b which is fixed to the rod 2 and is movable together with the rod 2.

The side plate 11a is formed of a material capable of shielding magnetism. Further, the side plate 11a has a plurality of magnetism passing holes 13 and a magnetism passing cut-out portion 14. The side plate 11a acts as a magnetism shielding means and the magnetism passing holes 13 and the magnetism passing cut-out portion 14 act as a magnetism passing means.

Figure 3:
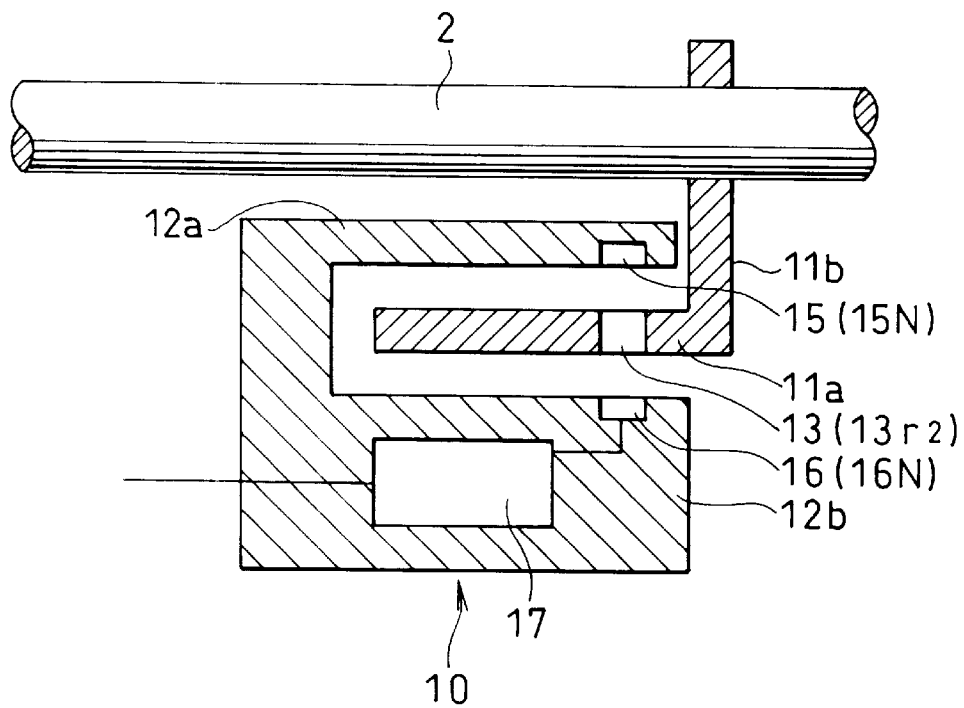
FIG. 3 is a sectional view taken along a line III—III of FIG. 1.

As shown in FIG. 3, the magnetism detecting section 12 comprises a magnetism generating section 12a provided opposite to the inner wall of the side plate 11a and a magnetism detecting and processing section 12b provided opposite to the outer wall of the side plate 11a. The magnetism generating section 12a is connected on the front side of the side plate 11a with the magnetism detecting and processing section 12b.

Figure 4:
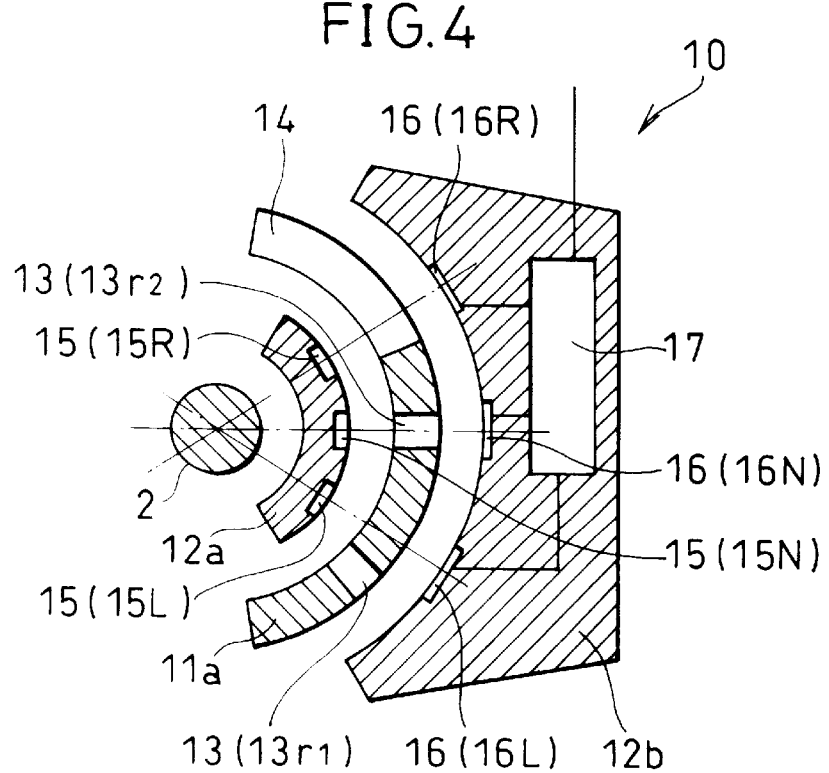
FIG. 4 is a sectional view taken along a line IV—IV of FIG. 1.

Further, as shown in FIGS. 3 and 4, three magnets 15 are buried on the outer periphery surface and near the rear end of the magnetism generating section 12a at an equal interval. These three magnets 15 are denoted as magnets 15R, 15N and 15L in an arranging order from top to bottom, respectively.

On the other hand, three hall elements 16 are buried on the inner periphery surface and near the rear end of the magnetism detecting and processing section 12b at an equal interval in an opposite position to the respective magnets 15R, 15N and 15L. That is, a hall element 16R is for detecting magnetism of the magnet 15R, a hall element 16N is for detecting magnetism of the magnet 15N, and a hall element 16L is for detecting magnetism of the magnet 15L.

The magnetism detecting and processing section 12b includes an amplification circuit 17 for amplifying signals from the respective hole elements 16R, 16N and 16L and outputting those to other control apparatuses such as an engine control unit (ECU) and a transmission control unit (TCU).

In this embodiment, gear positions can be detected based on the combination of the detecting condition of the respective hall elements 16R, 16N and 16L. The combination of the detecting condition of the hall elements 16R, 16N and 16L varies according to the arrangement of the magnetism passing holes 13 and a magnetism passing cut-out portion 14 provided in the side plate 11a.

FIGS. 6a through 6i are schematic, developmental views of the gear position detecting apparatus 10 as viewed from the top of the vehicle, showing the positional relationship between the magnetism passing means comprising the magnetic passing holes 13 and the magnetism passing cut-out portion 14 and the magnets 15.

As shown in FIG. 6a, four magnetism passing holes 13f1, 13f2, 13f3, 13f4 are provided from left to right on the front side of the side plate 11a and two magnetism passing holes 13r1, 13r2 are provided from left to right on the rear side of the side plate 11a. Further, one magnetism passing cut-out portion 14 are provided on the right rear side of the side plate 11a. Further, three magnets 15L, 15N, 15R are provided from left to right on the magnetism generating section 12a.

Those four front magnetism passing holes 13f1, 13f2, 13f3, 13f4 are for allowing magnetism to pass through when the shift lever 5 is tilted backward and those two rear magnetism passing holes 13r1 and 13r2 are for allowing magnetism to pass through when the shift layer is tilted forward. Further, the magnetism passing cut-out portion 14 is for allowing magnetism to pass through when the shift lever 5 is tilted forward.

When the shift lever 5 is positioned in 1st speed as shown in FIG. 6a, since the magnetism passing cut-out portion 14 allows to pass the magnetism from the magnet 15R and the side plate 11a shields the magnetism from the magnets 15L, 15N, the hall element 16R corresponding to the magnet 15R is turned ON and other hall elements 16L, 16N are turned OFF. Therefore, the combination of signals from the hall elements 16 is indicated as "001".

When the shift lever 5 is positioned in 2nd speed as shown in FIG. 6c, since the magnetism passing hole 13f4 allows the magnetism to pass from the magnet 15N and the side plate 11a shields the magnetism from the magnets 15L, 15R, the hall element 16N corresponding to the magnet 15N is turned ON and other hall elements 16L, 16R are turned OFF. Therefore, the combination of signals from the hall elements is indicated as "010".

When the shift lever 5 is positioned in 3rd speed as shown in FIG. 6d, since the magnetism passing cut-out portion 14 and the magnetism passing hole 13r2 allow the magnetism to pass from the magnet 15R and the magnet 15N, respectively and the side plate 11a shields the magnetism from the magnet 15L, the hall elements 16N, 16R corresponding to the respective magnets 15N, 15R are turned ON and the hall element 16L is turned OFF. Therefore, the combination of signals from the hall elements is indicated as "011".

When the shift lever 5 is positioned in 4th speed as shown in FIG. 6f, since the magnetism passing hole 13f2 allows the magnetism to pass from the magnet 15L and the side plate 11a shields the magnetism from the magnets 15N, 15R, the hall element 16L corresponding to the magnet 15L is turned ON and other hall elements 16N, 16R are turned OFF. Therefore, the combination of signals from the hall elements is indicated as "100".

When the shift lever 5 is positioned in 5th speed as shown in FIG. 6g, since the magnetism passing cut-out portion 14 and the magnetism passing hole 13r1 allow the magnetism to pass from the magnet 15R and the magnet 15L, respectively and the side plate 11a shields the magnetism from the magnet 15N, the hall elements 16L, 16R corresponding to the respective magnets 15L, 15R are turned ON and other hall element 16N is turned OFF. Therefore, the combination of signals from the hall elements is indicated as "101".

When the shift lever 5 is positioned in reverse speed as shown in FIG. 6i, since the magnetic passing holes 13f1, 13f3 allow the magnetism to pass from the magnets 15L, 15N, respectively and the side plate 11a shields the magnetism from the magnet 15R, the hall elements 16L, 16N corresponding to the respective magnets 15L, 15N are turned ON and the hall element 16R is turned OFF. Therefore, the combination of signals from the hall elements is indicated as "110".

When the shift lever 5 is positioned in N (neutral) position, as shown in FIGS. 6b, 6e and 6h, since the side plate 11a shields the magnetism from all the magnets 15L, 15N, 15R, all the hall elements 16L, 16N, 16R are turned OFF. Therefore, the combination of signals from the hall elements is indicated as "000".

An operation of the apparatus will be described with respect to an example of the case where the shift lever 5 is shifted from 2nd to 3rd.

First, the shift lever 5 is tilted towards the rear left side and the rod 2 travels in the axial rearward direction through the shift rod 4 and universal joint 3, while it is rotated to the left. Then, the selector arm provided at the front end of the rod 2 actuates a shifter rail corresponding to 2nd speed so that a shifter fork provided at the shifter rail selects 2nd gear.

In this state, since the rod 2 is moved backward and rotated to the left, the side plate 11a of the magnetism shielding plate 11 is also moved in the rear left direction through the supporting bottom plate 11b fixed to the rod 2.

As shown in FIG. 6c, the magnetism from the magnet 15N is allowed to pass through the magnetism passing hole 13f4 to turn the hall element 16N ON. Other hall elements 16L, 16R are turned OFF due to the magnetic shielding of the side plate 11a. As a result, the combination of detected signals from the respective hall elements 16L, 16N, 16R is expressed in a three digit binary coded number "010". The combination signal "010" is outputted to other control apparatuses such as an engine control unit (ECU) or a transmission control unit (TCU) and the like after being amplified by the amplification circuit 17. In ECU or TCU, when a binary combination signal "010" is inputted, it is judged that the transmission gear is now positioned in 2nd speed.

In order to change the transmission gears from 2nd to 3rd, the driver must return the shift lever 5 to a forward and backward neutral position (FIG. 6b), then return to a left and right neutral position (FIG. 6e) and after that shift into 3rd gear (FIG. 6d).

When the shift lever 5 is returned from 2nd gear position to the forward and backward neutral position, the rod 2 is moved in the axial and forward direction, while it is rotated to the left. Then, the selector arm which has been operated so as to hold the gear arrangement in 2nd gear operates the shifter rail or the shifter fork to release the 2nd gear arrangement. In this state, there is no engagement of gears in the transmission, therefore the driving force of the engine is transmitted nowhere.

When the shift lever 5 is returned from this state to the left and right neutral position, the rod 2 is rotated to the right without an axial movement. Then, the selector arm is also rotated but no gears are still engaged, therefore the driving force of the engine is transmitted nowhere.

On the other hand, in the gear position detecting apparatus 10, when the shift lever 5 is returned from 2nd to the forward and backward neutral position, the side plate 11a is moved in the axial and forward direction together with the rod 2, while it is rotated to the left.

Then, as shown in FIG. 6b, the respective magnetism from the magnets 15L, 15N, 15R are shielded by the side plate 11a and as a result all the hall elements 16L, 16N, 16R are turned OFF, thereby the combination signal "000" is outputted to other control apparatuses after being amplified by the amplification circuit 17. In these control apparatuses, it is judged that the gear position is now in neutral speed.

Further, when the shift lever 5 is returned from this state to the left and right neutral position, the rod 2 is rotated to the right without an axial movement and the side plate 11a is also rotated to the right, while it retains the axial position.

As a result, as shown in FIG. 6e, the respective magnetism from the magnets 15L, 15N, 15R are shielded by the side plate 11a and all the hall elements 16L, 16N, 16R are retained in an OFF condition, thereby the combination signal "000" is outputted to other control apparatuses after being amplified by the amplification circuit 17.

After that, when the shift lever 5 is tilted forward, the rod 2 is moved in the axial and forward direction through the shift rod 4 and the universal joint 3 without a rotational movement. At this moment, the selector arm of the rod 2 operates the shifter rail, the shifter fork moves gears, and 3rd gear is obtained.

In the gear position detecting apparatus 10, on the other hand, since the rod 2 is moved in the axial and forward direction, the side plate 11a of the magnetic shielding plate 11 is also moved forward.

As a result, the hall element 16N is turned ON due to the magnetism coming from the magnet 15N through the magnetic passing hole 13r2, the hall element 16R is turned ON due to the magnetism coming from the magnet 15R through the magnetic passing cut-out portion 14, and the hall element 16L is turned OFF due to the magnetic shielding of the side plate 11a. Thus, the combination signal "011" is outputted to other control apparatuses after being amplified by the amplification circuit 17.

With respect to other gear changes, similar steps are taken to detect gear positions.

According to the embodiment of the present invention, three magnets 15 provided in the magnetism generating section 12a and three hall elements 16 provided in the magnetism detecting and processing section 12b enable detecting gear positions or neutral positions of the transmission having five forward speeds and one reverse speed. That is, compared to the prior art needing six magnets and six hall elements in case of the same transmission, it is possible to detect gear positions with a small number of components, a small number of wiring arrangements, a small sized apparatus, and a low cost.

Further, in this embodiment, the transmission having five forward speeds and one reverse speed has been exemplified, however it is possible to detect gear positions of a transmission having maximum eight positions including neutral, for example, six forward speeds, one reverse speed and one neutral position.

In this case, when this apparatus is applied to a transmission having a different number of gear positions, for example, from a five forward speed transmission to a four forward speed transmission, the application is available only by changing the magnetism passing holes 13 and the magnetism passing cut-out portion 14 without changing the positions of the magnets 15 and the hall elements 16.

In this embodiment, the magnetism generating section is provided inside of the side plate of the magnetism shielding plate and the magnetism detecting and processing section is provided outside of the side plate, however, alternatively the magnetism generating section may be provided outside of the side plate and the magnetism detecting and processing section may be provided inside of the side plate.

Further, in this embodiment, the magnetism shielding plate is provided in the rod and the magnetism detecting section is provided in the transmission housing, however, alternatively the magnetism shielding plate may be provided in the transmission housing and the magnetism detecting section may be provided in the rod.

Further, in this embodiment, the magnetism detecting section comprises three independent magnets so as to correspond with three hall elements, however, these three magnets may be replaced with one strip-shaped magnet.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A gear position sensor system for an automobile transmission having a shift lever, a rod slidably and rotatably moved according to a movement of said shift lever for selecting a gear position and a transmission housing, comprising:

magnetism generating means for generating magnetism;

detecting means for detecting said magnetism and having a plurality of elements to detect said magnetism per each element, said magnetism generating means and said detecting means being fixed on one of said rod and said transmission housing;

shielding means fixed on the other of said rod and said transmission housing and provided between said magnetism generating means and said detecting means for selectively allowing said magnetism to pass through to each of said elements so as to form a combination of magnetism detecting condition for said detecting means corresponding to a selected shift position, said combination being predetermined per each shift position; and judging means for judging a selected gear position based on said combination.

2. The gear position sensor system according to claim 1, wherein said shielding means includes a shielding plate with a plurality of holes and a cut-out portion, said plurality of holes and said cut-out portion being arranged in said shielding plate for passing the magnetism to said detecting means so as to form said combination corresponding to the selected shift position.

3. The gear position sensor system according to claim 1, wherein said magnetism generating means includes three magnets.

4. The gear position sensor system according to claim 1, wherein said magnetism generating means includes at least one strip shaped magnet.

5. The gear position sensor system according to claim 1, wherein said detecting means includes three hall elements for detecting said magnetism at three different positions.

6. The gear position sensor system according to claim 1, wherein said magnetism generating means and said magnetism detecting means are fixed to said transmission housing and said magnetism shielding means is fixed to said rod to change a relative position to said magnetism generating means and said magnetism detecting means by moving said magnetism shielding means together with said rod.

7. The gear position sensor system according to claim 1, wherein said magnetism generating means is provided inside of said shielding means and said magnetism detecting means is provided outside of said shielding means.

8. The gear position sensor system according to claim 1, wherein said magnetism shielding means is fixed to said transmission housing and said magnetism generating means and said magnetism detecting means are fixed to said rod so as to move together with said rod to change a position relative to said magnetism shielding means by movement of said magnetism generating means and said magnetism detecting means together with said rod.

9. The gear position sensor system according to claim 1, wherein two of said plurality of holes are located in said shielding plate at a position for passing said magnetism and other holes are located in said shielding plate at a position for shielding said magnetism when said shift lever is positioned in a reverse speed.

10. The gear position sensor system according to claim 9, wherein one of said plurality of holes is located in said shielding plate at a position for passing said magnetism and other holes are located in said shielding plate at a position for shielding said magnetism when said shift lever is positioned in fourth speed.

11. The gear position sensor system according to claim 10, wherein one of said plurality of holes is located in said shielding plate at a position for passing said magnetism and other holes are located in said shielding plate at a position for shielding said magnetism when said shift lever is positioned in a second speed.

12. The gear position sensor system according to claim 11, wherein one of said plurality of holes is located in said shielding plate at a position for passing said magnetism and other holes are located in said shielding plate at a position for shielding said magnetism when said shift lever is positioned in a fifth speed.

13. The gear position sensor system according to claim 12, wherein one of said plurality of holes is located in said shielding plate at a position for passing said magnetism and other holes are located in said shielding plate at a position for shielding said magnetism when said shift lever is positioned in a third speed.

14. The gear position sensor system according to claim 13, wherein said cut-out portion is located in said shielding plate for passing said magnetism when said shift lever is positioned in a first, third and fifth gear positions.

* * * * *